(12) United States Patent
Chou et al.

(10) Patent No.: US 7,739,963 B2
(45) Date of Patent: Jun. 22, 2010

(54) BREAKAWAY TRAY ASSEMBLY

(75) Inventors: Warren Jing Po Chou, Livonia, MI (US); Lauren Michelle Marzolf, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 329 days.

(21) Appl. No.: 11/843,407

(22) Filed: Aug. 22, 2007

(65) Prior Publication Data

US 2009/0050659 A1   Feb. 26, 2009

(51) Int. Cl.
*A47B 37/00* (2006.01)

(52) U.S. Cl. ...................... 108/44; 296/24.34

(58) Field of Classification Search .............. 108/42, 108/44, 67, 171, 77, 65, 69; 296/24.34, 24.39, 296/37.8, 37.15; 224/275, 282; 297/135, 297/188.2; 312/235.2, 235.8, 235.9, 313, 312/231
See application file for complete search history.

(56) References Cited

U.S. PATENT DOCUMENTS

| | | | | |
|---|---|---|---|---|
| 486,602 | A | * | 11/1892 | Hawkins .................. 108/3 |
| 711,048 | A | * | 10/1902 | Morton .................... 108/3 |
| 2,012,660 | A | * | 8/1935 | Dunning .................. 108/38 |
| 2,184,047 | A | * | 12/1939 | King ..................... 312/235.8 |
| 3,660,934 | A | | 5/1972 | Pollack et al. |
| 3,773,381 | A | | 11/1973 | Brennan |
| 4,600,255 | A | | 7/1986 | Dubarko |
| 4,726,621 | A | | 2/1988 | Muller et al. |
| 5,050,929 | A | * | 9/1991 | Gueringer et al. .......... 297/145 |
| 5,100,095 | A | | 3/1992 | Haan et al. |
| 5,104,187 | A | | 4/1992 | Fischer et al. |
| 5,269,229 | A | | 12/1993 | Akapatangkul |
| 5,687,651 | A | * | 11/1997 | Hurayt et al. .............. 108/44 |
| 5,876,092 | A | | 3/1999 | An et al. |
| 5,927,799 | A | * | 7/1999 | Tornero .................. 297/145 |
| 5,931,527 | A | | 8/1999 | D'Onofrio et al. |
| 5,967,479 | A | | 10/1999 | Sweere et al. |
| 6,058,566 | A | | 5/2000 | Kerr et al. |
| 6,283,528 | B1 | * | 9/2001 | Townsend ............... 296/65.01 |
| 6,494,533 | B1 | | 12/2002 | Bohler et al. |
| 6,513,687 | B1 | | 2/2003 | Siniarski et al. |
| 6,547,323 | B1 | * | 4/2003 | Aitken et al. ............. 297/113 |
| 6,683,837 | B1 | | 1/2004 | Kayl |
| 6,758,518 | B2 | | 7/2004 | Ingram et al. |
| 6,786,523 | B2 | | 9/2004 | Ogura et al. |

(Continued)

FOREIGN PATENT DOCUMENTS

WO  WO-2005/068257  7/2005

*Primary Examiner*—Janet M Wilkens
(74) *Attorney, Agent, or Firm*—Gifford, Krass, Sprinkle, Anderson & Citkowski, P.C.

(57) ABSTRACT

A breakaway tray assembly for supporting items is disclosed. The tray assembly has a first tray that is movably attached to a support structure and a second tray that is pivotally attached to and extends from the first tray. The support structure has a bracket that supports the first tray in the extended generally horizontal position and can assist in holding the first tray in a generally vertical position when said first tray is placed in a stored-away position. The second tray has an upright position wherein it is generally coplanar with and semi-rigidly extends from the first tray. The second tray also has a breakaway position where it is not generally coplanar with the first tray.

13 Claims, 3 Drawing Sheets

U.S. PATENT DOCUMENTS

| | | |
|---|---|---|
| 6,792,875 B2 | 9/2004 | Williamson et al. |
| 6,808,097 B2 | 10/2004 | Kim et al. |
| 6,935,601 B2 | 8/2005 | Tanaka et al. |
| 7,114,755 B1 * | 10/2006 | Sturt et al. ............... 296/24.34 |
| 7,201,439 B2 * | 4/2007 | Schweizer .................. 297/145 |
| 7,306,282 B2 * | 12/2007 | Salzer et al. ................ 297/146 |
| 2007/0000959 A1 * | 1/2007 | Perin .......................... 224/275 |

* cited by examiner

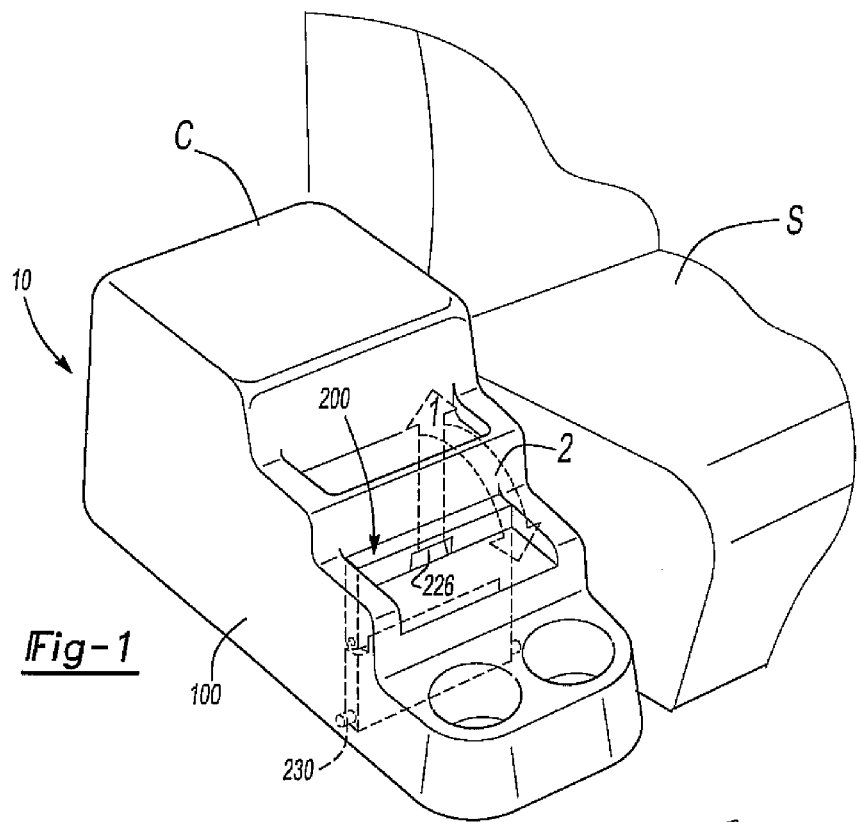
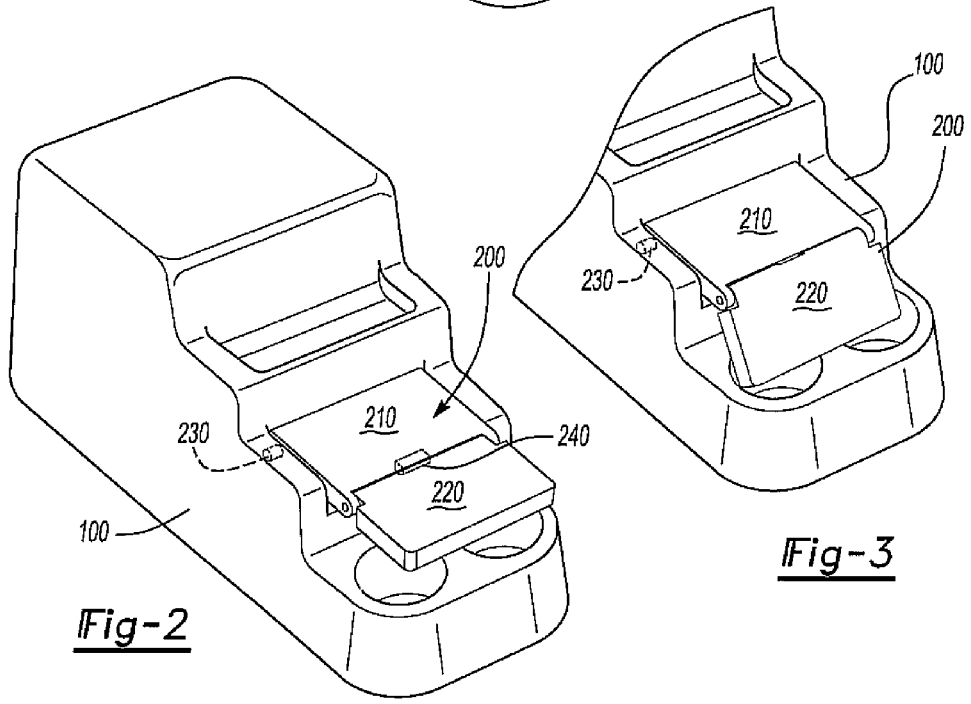

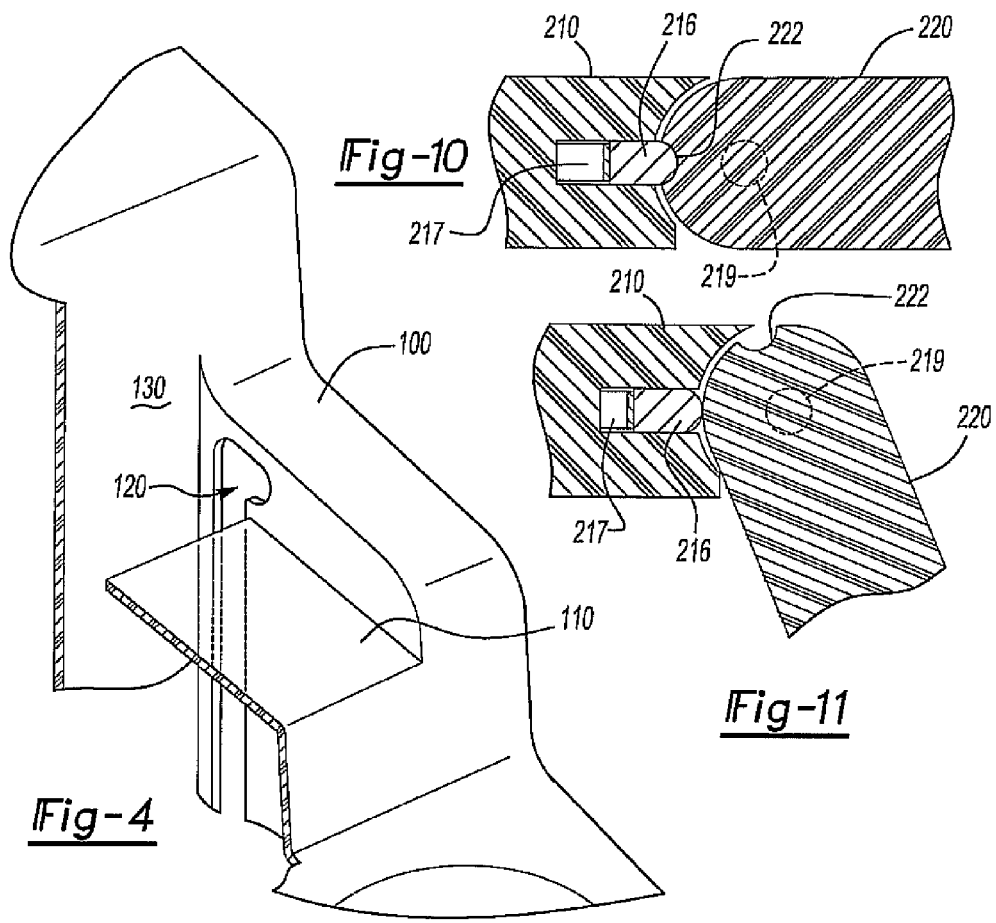
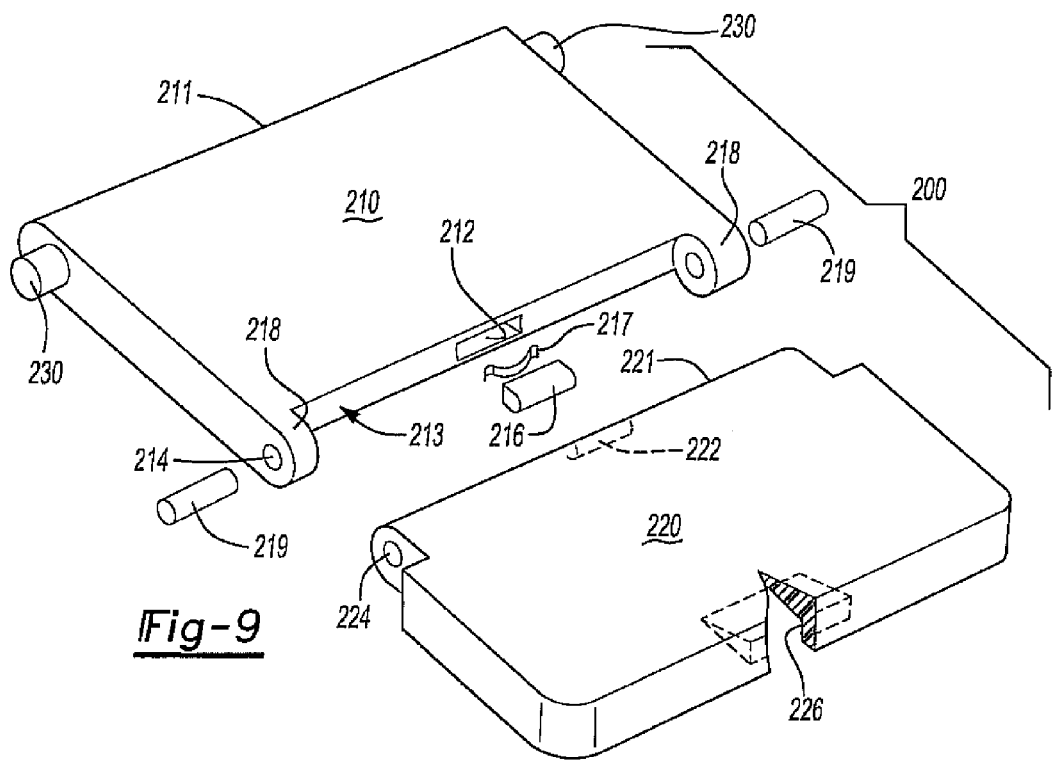

BREAKAWAY TRAY ASSEMBLY

FIELD OF THE INVENTION

The present invention relates to a tray. In particular, the present invention relates to a breakaway tray assembly.

BACKGROUND OF THE INVENTION

The use of cup holders, storage bins and the like is common within motor vehicles. In addition, beverage container holders that extend from a console or dashboard are known to those skilled in the art. However, the use of a tray to hold items has not been fully developed. In particular, a tray that has a stored-away position wherein the tray does not occupy limited interior space within a motor vehicle and an extended in-use position where the tray can be used would be desirable. However, the use of such a tray should afford for the possibility of an occupant impacting the tray during a sudden stop or accident and thus have a mechanism wherein at least part of the tray collapses. Therefore, a breakaway tray assembly that can be stored away and then extended when in use would be desirable.

SUMMARY OF THE INVENTION

The present invention discloses a breakaway tray assembly for supporting items, the tray assembly having a first tray that is movably attached to a support structure and a second tray that is pivotally attached to and extends from the first tray. The first tray has a generally flat top surface, the top surface being operable to support an item when the first tray is in an extended generally horizontal position. The support structure has a bracket that supports the first tray in the extended generally horizontal position and can assist in holding the first tray in a generally vertical position when said first tray is placed in a stored-away position. The second tray has an upright position wherein it is generally coplanar with and semi-rigidly extends from the first tray. The second tray also has a breakaway position where it is not generally coplanar with the first tray.

The first tray and the second tray have a breakaway mechanism that can include a spring-tab recess within the first tray, a tab recess within the second tray, a spring and a tab. The spring and tab fit at least partially within the spring-tab recess, with the spring pushing the tab in a generally outward direction from the spring-tab recess and at least partially within the tab recess of the second tray when the second tray is in the upright position. The tab within the tab recess of the second tray is operable to hold the second tray generally coplanar with the first tray. Upon application of a sufficient force onto the second tray, for example during an accident, the second tray is operable to break away or collapses from the first tray and pivot to a non-coplanar position.

BRIEF DESCRIPTION OF THE FIGURES

FIG. 1 is a perspective view of an embodiment of the present invention wherein a breakaway tray assembly is in a stored-away position;

FIG. 2 is a perspective view of the embodiment shown in FIG. 1 wherein the tray assembly is in an extended in-use position;

FIG. 3 is the embodiment shown in FIG. 2 wherein the tray assembly is shown in a breakaway position;

FIG. 4 is a cutaway perspective view of an embodiment of the present invention wherein a guide rail is illustrated;

FIG. 9 is a perspective view of a breakaway tray assembly illustrating a breakaway mechanism;

FIG. 10 is a side cross-sectional view of the embodiment shown in FIG. 9 wherein the breakaway tray assembly is illustrated in the upright position; and FIG. 11 is a side cross-sectional view of the embodiment shown in FIG. 10 wherein the breakaway tray assembly is illustrated as in the breakaway position.

DETAILED DESCRIPTION OF THE PREFERRED EMBODIMENTS

Figure 8:
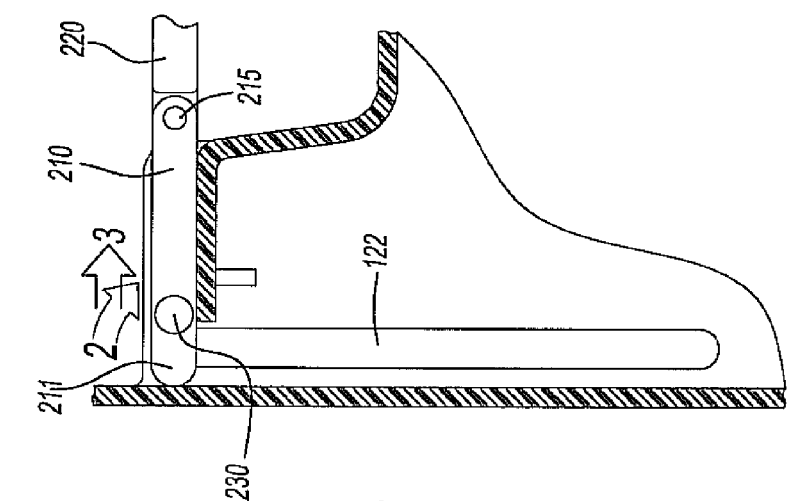
FIG. 8 is a side cross-sectional view of the embodiment shown in FIG. 7 wherein the breakaway tray assembly is illustrated as having pivoted from the generally vertical orientation to a generally horizontal orientation.

Disclosed is a breakaway tray assembly that affords for a tray to be used in a motor vehicle and yet collapse when impacted by a sufficient force, for example during an accident. As such, the present invention has utility as a support surface that can be selectively used in a motor vehicle.

The present invention includes a support structure to which a breakaway tray assembly is movably attached. The breakaway tray assembly includes at least two trays, the two trays operable to be placed in a generally coplanar orientation with each other and used as a continuous surface to support items. The at least two trays are also operable to collapse or break away from the generally coplanar orientation and leave at least one tray in a usable generally horizontal position. In this manner, the potential for an impact hazard during an accident is reduced. The breakaway tray assembly can also be stored in a stored-away position that is out of sight and/or removed from the limited interior space within the motor vehicle.

Turning now to FIGS. 1-3, a perspective view of an embodiment of the present invention is shown generally at reference numeral 10. The breakaway tray assembly 10 includes a support structure 100 and a tray assembly 200. The support structure 100 can be part of a console C located adjacent to a seat S. As illustrated in FIG. 1, the tray assembly 200 can be placed in a stored-away position such that it is out of sight and/or removed from the limited interior space within a motor vehicle. When the tray assembly 200 is needed, the tray assembly 200 can be moved along a first direction 1 and then rotated in a second direction 2. Upon rotation in the second direction 2, the tray assembly can reach an in-use position as shown in FIG. 2. While in the in-use position, the tray assembly 200 is in a generally horizontal position with a first tray 210 and a second tray 220 extending from the support structure 100. The second tray 220 extends semi-rigidly from the first tray 210 and is generally coplanar therewith. In some instances, the first tray 210 can include a pin 230 which affords for slidable movement and rotation of the first tray 210 with respect to the support structure 100. Upon receiving sufficient force thereon, the second tray 200 is operable to break away from the generally coplanar orientation with the first tray 210 and fall or rotate to a non-coplanar position as shown in FIG. 3.

Turning now to FIG. 4, an embodiment of the present invention includes a guide groove 120 as part of the support structure 100. Also included as part of the support structure 100 is a bracket 110 that affords for support of the first tray 210 when said tray is in the generally horizontal position.

Figure 5:
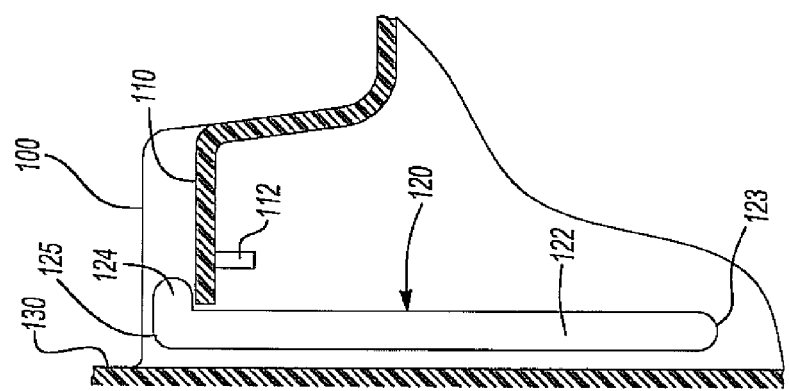
FIG. 5 is a side cross-sectional view of an embodiment of the present invention wherein a guide rail is illustrated.

FIGS. 5-8 illustrate a side cross-sectional view of FIG. 4 with FIG. 5 illustrating a support tab 112 that provides support to the bracket 110 and the guide groove 120 having a first section 122 and a second section 124. The first section 122 of the guide groove 120 has a generally vertical orientation with a bottom end 123 and a top end 125. The second section 124 extends from the top end 125 of the first section 122 in a generally horizontal direction.

Figure 7:
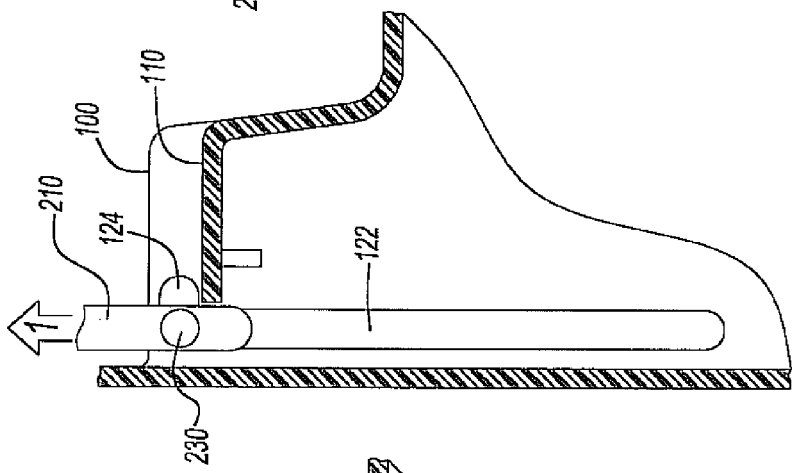
FIG. 7 is a side cross-sectional view of the embodiment shown in FIG. 6 wherein the breakaway tray assembly has been moved from the stored-away position to a position at the top of the guide rail.
Figure 6:
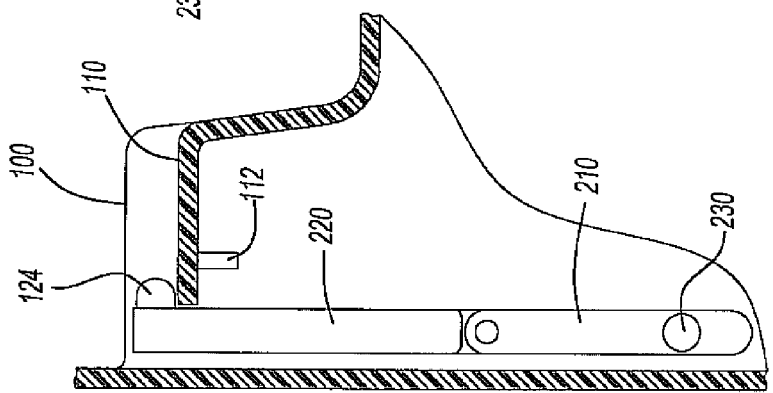
FIG. 6 is a side cross-sectional view of the embodiment shown in FIG. 5 wherein a breakaway tray assembly is in a generally vertical stored-away position.

Turning to FIG. 6, the tray assembly 200 is illustrated in the stored-away position and is held in a generally vertical orientation between a backing plate 130 and the bracket 110. Upon moving the tray assembly 200 in the first direction 1, e.g. when the tray assembly is pulled in an upward direction by an occupant, the pin 230 slides within the first section 122 of the guide groove 120 as illustrated in FIG. 7. When the pin 230 reaches the top end 125 of the first section 122, the second section 124 affords for the rotation of the tray assembly 200 in the second direction 2. In addition, a first end 211 of the first tray 210 can contact the backing plate 130 and force the first tray 210 in a third direction 3. The pin 230 slides along the second section 124 and the first tray 210 with the second tray 210 semi-rigidly attached thereto is placed in the in-use position.

Turning now to FIG. 9, the tray assembly 200 with an illustrative breakaway mechanism between the first tray 210 and the second tray 220 is illustrated. The first tray 210 can include a spring-and-tab recess 212 that is at least partially within a second end 213. A tab 216 and a spring 217 can be located at least partially within the spring-and-tab recess 212, with the spring 217 pushing the tab 216 in a generally outward direction. The second tray 220 can include a tab recess 222 that affords for the insertion of the tab 216. The first tray 210 can further include a pair of flanges 218, the flanges 218 each having an aperture 214.

The second tray 220 has a first end 221 with a pair of apertures 224 that align with the apertures 214 of the first tray 210 and afford for the attachment of the second tray 220 to the first tray 210. The attachment of the second tray 220 to the first tray 210 using apertures 214 and apertures 224 can include the use of a pin 219, bolts, screws and the like. It is appreciated from FIG. 9, and FIGS. 10 and 11 discussed in more detail below, that the first tray 210 has an edge portion that overlaps and an edge portion of the second tray 220, and a pivot axis extends through the first and second trays such that the second tray 213 is pivotally mounted to the first tray 210. The second tray 220 can also include a handle 226 which can be grasped by an occupant of the motor vehicle. With the attachment of the second tray to the first tray 210 and the tab 216 at least partially within the tab recess 222 of the second tray 220, the breakaway mechanism affords for the second tray 220 to be semi-rigidly held in a generally coplanar position with the first tray 210. In this position, the second tray 220 is operable to support items thereon.

Turning now to FIGS. 10 and 11, a side cross-sectional view of the illustrative breakaway mechanism described above is provided. As shown in FIG. 10, the spring 217 applies force upon the tab 216 in a generally outward direction, thereby resulting in the tab 216 being at least partially within the tab recess 222. In this manner, the second tray 220 is held in a generally coplanar orientation with respect to the first tray 210. Upon exertion of sufficient force upon the second tray 220, the tab recess 222 escapes from the tab 216 and the second tray 220 falls to a non-coplanar position. In this manner, a breakaway tray assembly is afforded. It is appreciated that the force required to cause the second tray 220 to breakaway from the first tray 210 can be varied depending on factors known to those skilled in the art, for example the flexure strength of the spring 217, the distance the tab 216 fits within the tab recess 222, the shape of the tab 216 and/or tab recess 222 and the like. It is also appreciated that the breakaway mechanism can afford for an occupant to grasp the second tray 220 and apply force thereto in order to cause the second tray to move from the upright position to the breakaway position, and vice versa, i.e. once the second tray 220 is the in breakaway position, an occupant can grasp the tray 220 and place it into the upright position with the tab 216 within the tab recess 222.

Although the figures illustrate the breakaway tray assembly 200 being held in a generally vertical orientation when in the stored-away position, other stored-away orientations fall within the scope of the present invention. For example, the tray assembly 200 could slide horizontally back within the support structure 100 and be placed out of sight and/or out of the way of occupants within the motor vehicle. Likewise, the tray assembly 200 could slide or be moved in any direction that affords for the tray assembly to be placed in a stored-away position.

It is appreciated that other breakaway mechanisms fall within the scope of the present invention. In some instances, more than one spring 217 and tab 216 along with associated recesses can be used to afford for the second tray 220 to be held in a semi-rigid fashion coplanar with the first tray 210. Likewise, other types of springs, tabs and the like can be used so long as a breakaway tray assembly is provided that affords for a first tray to be held in a generally horizontal position and operable to support an item on the top surface thereof with a second tray semi-rigidly attached to and extending from the first tray in a generally coplanar orientation. It is also appreciated that the slidable movement of the first tray 210 with respect to the support structure 100 can include any structure that affords for the desired movement therebetween as described above. For example, a guide groove can be at least partially within the tray assembly and a pin can extend from the support structure 100 into the tray assembly guide groove. In addition, other support structures are within the scope of the present invention, illustratively including seat backs, interior panels and the like. The tray assembly 200 and the support structure 100 can be made from any material known to those skilled in the art, illustratively including metals, alloys, plastics, ceramics and combinations thereof.

The invention is not restricted to the illustrative examples described above. The examples are not intended as limitations on the scope of the invention. Methods, apparatus and the like described herein are exemplary and not intended as limitations on the scope of the invention. Changes therein and other uses will occur to those skilled in the art. The scope of the invention is defined by the scope of the claims.

We claim:

1. A breakaway tray assembly for supporting items, said tray assembly comprising:

a tray assembly having a first tray and a second tray, said first tray and said second tray having a stored-away position and a useable position:

said first tray being in a generally vertical position when in said stored-away position and in a generally horizontal position when in said useable position;

said second tray being in a generally vertical position when in said stored-away position and generally coplanar with and semi-rigidly extending from said first tray when in said useable position, said second tray also having a breakaway position that is not generally coplanar with said first tray in said useable position;

said first tray having an edge portion overlapping an edge portion of said second tray with a pivot axis extending through said first tray and said second tray with said second tray pivotally mounted to said first tray; and a spring loaded latch extending between said first tray and said second tray, said spring loaded latch assisting in the release of said second tray from said useable position into said breakaway position when a predetermined amount of downward force is applied to said second tray in said useable position.

2. The tray assembly of claim 1, further comprising a support structure, said first tray movably mounted to said support structure.

3. The tray assembly of claim 2, wherein said support structure has a support member operable to support said first tray in said generally horizontal position when said tray assembly is in said useable position.

4. The tray assembly of claim 2, wherein said tray assembly is operable to be placed in said stored-away position at least partially within said support structure.

5. The tray assembly of claim 2, wherein said support structure has two guide rails, said two guide rails oppositely disposed from each other.

6. The tray assembly of claim 5, wherein said first tray is movably attached to said two guide rails.

7. The tray assembly of claim 6, wherein said first tray has two pins oppositely disposed from each other, each of said two pins at least partially within one of said two guide rails.

8. The tray assembly of claim 7, wherein said two guide rails each have a first section and a second section, said first section being generally vertical and having a top end, said second section extending from said top end of said first section in a generally horizontal direction, said first section and said second section operable for said tray assembly to be stored in a generally vertical orientation when in said stored-away position and removed placed in said useable position by sliding said tray assembly in an upward vertical direction and pivoting about said pins to a generally horizontal orientation.

9. The tray assembly of claim 1, wherein said spring loaded latch has:

a spring-tab recess within said first tray, a tab recess within said second tray, a spring and a tab;

said spring and tab at least partially within said spring-tab recess, said spring pushing said tab in a generally outward direction from said spring-tab recess and at least partially within said tab recess of said second tray when said second tray is in said upright position;

said tab within said tab recess operable to hold said second tray generally coplanar with said first tray.

10. The tray assembly of claim 9, wherein said spring-tab recess is within said second tray and said tab recess is within said first tray.

11. A breakaway tray assembly for use in a motor vehicle, said breakaway tray assembly comprising:

a support structure having a guide rail;

a first tray having a first end movably attached to said guide rail of said support structure and a second end oppositely disposed and spaced apart from said first end;

said first tray slidable within said guide rail between a generally vertical stored-away position and a generally horizontal useable position;

a second tray having a useable position and a breakaway position, said second tray pivotally attached to and extending from said second end of said first tray, said second tray also generally coplanar with and semi-rigidly extending from said first tray when in said useable position and not generally coplanar with said first tray when in said breakaway position;

said first tray having an edge portion overlapping an edge portion of said second tray with a pivot axis extending through said edge portion of said first tray and said edge portion of said second tray with said second tray pivotally mounted to said first tray; and a spring loaded latch extending between said first tray and said second tray, said spring loaded latch operable to release said second tray from said useable position into said breakaway position when a predetermined amount of downward force is applied to said second tray in said useable position.

12. The breakaway tray assembly of claim 11, wherein said guide rail has a generally vertical section with a top end and a generally horizontal section extending from said top end of said vertical section.

13. The breakaway tray assembly of claim 12, wherein said support structure has a support member proximate to and extending in a generally parallel direction with said horizontal section of said guide rail.

* * * * *